United States Patent
Fowler et al.

[11] Patent Number: 5,702,145
[45] Date of Patent: Dec. 30, 1997

[54] FOLDING SECOND SEAT WITH SEAT TRACK RELEASE LATCH MECHANISM

[75] Inventors: Thomas J. Fowler, Allen Park; Liviu Rus, Troy, both of Mich.

[73] Assignee: Lear Seating Corporation, Southfield, Mich.

[21] Appl. No.: 636,279

[22] Filed: Sep. 27, 1996

Related U.S. Application Data

[63] Continuation-in-part of Ser. No. 267,977, Jun. 29, 1994, abandoned.

[51] Int. Cl.$^6$ .................................................. B60N 2/36
[52] U.S. Cl. ........................ 296/66; 296/65.1; 296/68.1
[58] Field of Search ..................... 296/68.1, 66, 65.1; 297/378.12, 335, 336

[56] References Cited

U.S. PATENT DOCUMENTS

| | | |
|---|---|---|
| 4,133,556 | 1/1979 | Glinski .................... 296/65.1 |
| 5,044,683 | 9/1991 | Pärsson .................... 296/65.1 |
| 5,156,438 | 10/1992 | Hayakawa et al. ............. 297/335 |
| 5,383,699 | 1/1995 | Woziekonski et al. .......... 296/65.1 |
| 5,570,931 | 11/1996 | Kargilis et al. ............. 296/65.1 |

*Primary Examiner*—Gary C. Hoge
*Attorney, Agent, or Firm*—Howard & Howard

[57] ABSTRACT

A vehicular seat assembly (28), fixedly secured to a floor (24) of a vehicle (10), is movable between a seat forming position (FIG. 1), a storage access position (FIG. 3) and a load floor position (FIG. 5). The seat frame structure (30) includes a front member (38) and a back member (40), both of which are slidable along a track (32). The seat cushion (42) pivots about the front member (38) when it is released from the back member (40). This rotational movement allows a safety lock lever (60) to rotate counter-clockwise (as viewed in the Figures) forcing a cam pin (64) downwardly. The cam (62) also pivots downwardly disengaging itself from its follower (66). Because the follower (66) cannot force the cam (62) downwardly, the seat adjustment mechanism (53) is prevented from moving to its release position to unlocking the vehicular seat assembly (10) from the track (32). The vehicular seat assembly (10) can slide along the track (32) only when the seat cushion (42) is locked into the back member (40) of the seat frame structure (30).

8 Claims, 3 Drawing Sheets

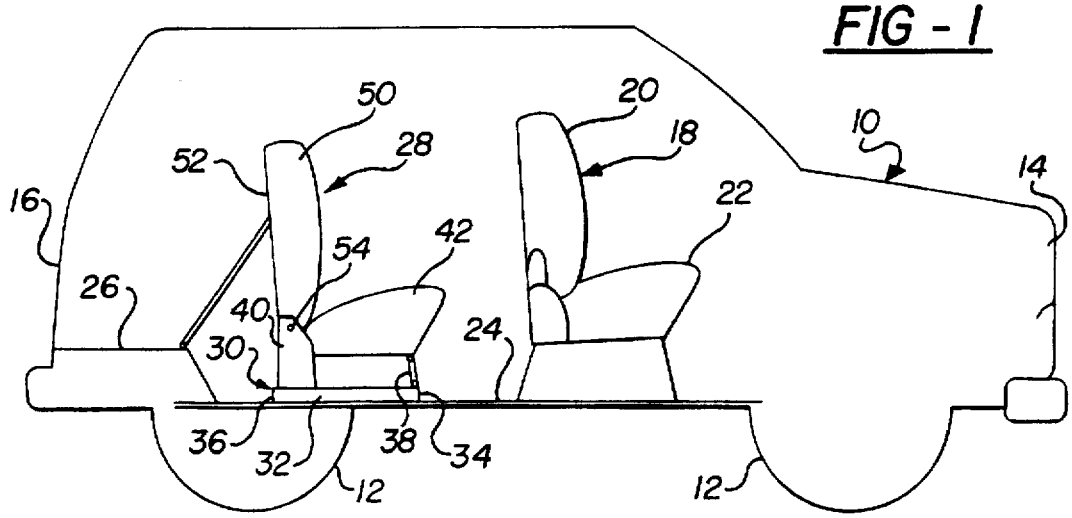
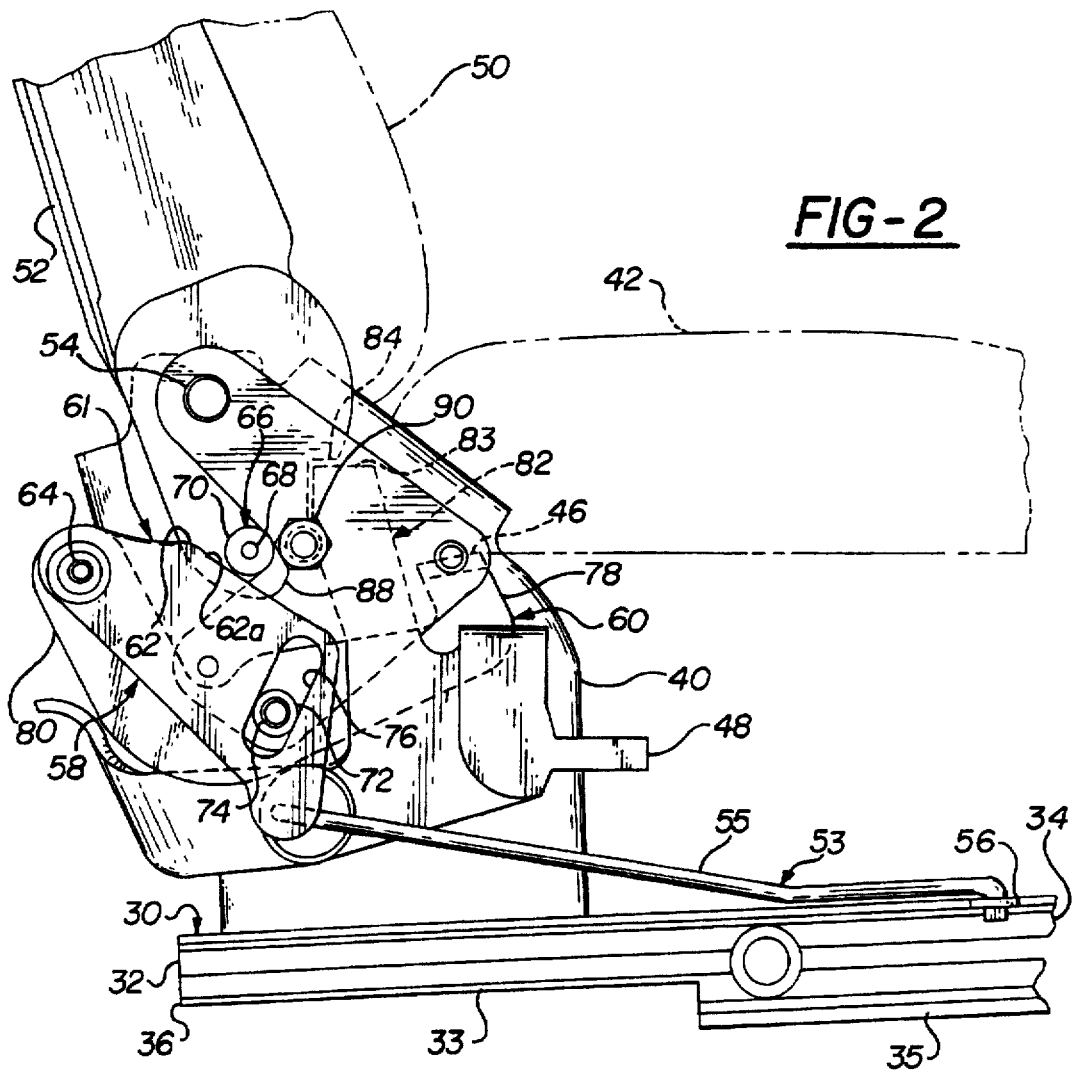

FOLDING SECOND SEAT WITH SEAT TRACK RELEASE LATCH MECHANISM

This application is a continuation-in-part of application Ser. No. 08/267,977, filed Jun. 29, 1994 now abandoned.

BACKGROUND ART

1. Technical field

The subject invention relates to vehicular seat latches. More particularly, the subject invention relates to a vehicular seat latch for moving a vehicular seat between three positions.

2. Background of the Invention

Multi-purpose and sport-utility vehicles are becoming increasingly popular. The requirement that the vehicles can handle either a load or passengers with equipment that is easily convertible by the operator of the vehicle has become very desirable. Seat latches must be versatile to allow seats to move and pivot to different positions depending upon the current needs of the user, as well as light-weight and unobtrusive to aid in the convertibility of the seats. Further, the seats must provide safety features transparent to the seat user to insure the seats remain in the desired locations and positions.

U.S. Pat. No. 5,156,438, issued to Hayakawa et al. on Oct. 20, 1992, discloses a seat latch for converting a seat into a more condensed configuration and for sliding the condensed seat up along a set of tracks to increase the space with which to receive a load. The structure disclosed does not, however, include a locking disengager which prevents the seat from unlocking from the track and slide freely when the seat cushion is folded up along side the seat back. This feature is critical when the seat back is converted into an extension of the load floor wherein a heavy load may force an unlocking mechanism to unlock the seat with respect to the track allowing the load and the seat to move undesirably which may result in damage to the seat, load, vehicle and potentially any passengers located therein.

SUMMARY OF THE INVENTION AND THE ADVANTAGES

A vehicular seat assembly is fixedly securable to a floor of a vehicle. The vehicular seat assembly comprises a seat back and a seat cushion supported for pivotal movement into and out of a seat forming position. Seat track means movably support the seat back and the seat cushion. The seat track means includes seat adjustment means which is selectively operable between a locked position for preventing fore and aft adjustment of the seat back and the seat cushion and a release position for adjusting the fore and aft position of the seat back and the seat cushion. The vehicular seat assembly is characterized by safety locking means which prevents the fore and aft adjustment of the seat back and the seat cushion in response to pivotal movement of the seat cushion out of the seat forming position.

The advantage associated with the subject invention includes the ability to automatically disengage the locking mechanism of the seat latch when the seat is moved to a pay load or load floor position. The automatic disengagement of the unlocking mechanism will prevent the seat assembly from shifting once a load has been placed on the load receiving floor resulting from the normal vehicle floor extended by the seat back being lowered into position of a load receiving floor position. Thus, the danger from the seat unlocking allowing the seat, along with the pay load, to shift and potentially harm any passengers in the vehicle, can be eliminated.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of two vehicular seats inside a cross-section of an automobile;

FIG. 2 is a side view of the preferred embodiment of the subject invention shown in the upright seating position;

DETAILED DESCRIPTION OF THE DRAWING

Figure 3:
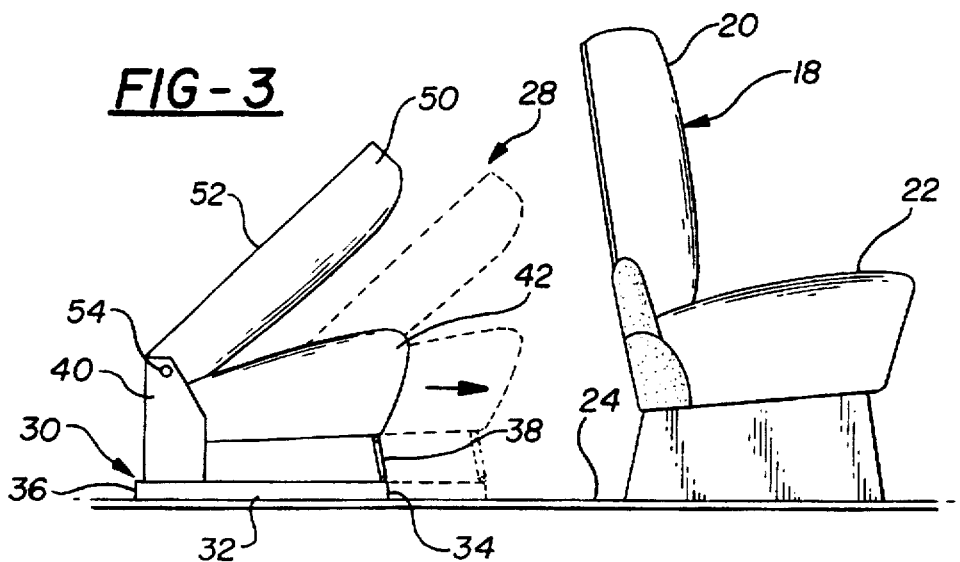
FIG. 3 is a side view of two vehicular seats with the second seat shown in the storage access position.

A cross section of a vehicle 10 is shown in FIG. 1. The vehicle 10 includes four tires 12 (two shown), a front end 14 and a rear end 16. The vehicle 10 includes a first seat, generally shown at 18 including a seat back 20 and a seat cushion 22. The first seat assembly 18 may include a bench seat or two bucket seats. The vehicle 10 includes a floor 24 and a load floor 26 located behind the second seat assembly 28, discussed subsequently.

The vehicular seat assembly 28 which is the second seat assembly in the Figures, is attachable to the floor 24 of the vehicle 10. The vehicular seat assembly 28 comprises a seat frame structure generally shown at 30 which includes a seat track means 32. The seat track means 32 is fixedly secured to the floor 24 of the vehicle 10. The seat track means 32 includes an upper sliding track 33 and a lower fixed track 35. The lower fixed track 35 is fixedly mounted to the vehicle floor 24 and the upper sliding track 33 supports the assembly 28 and provides fore and aft sliding adjustment or movement of the seat assembly 28. The seat frame structure 30 defines a forward end 34 and a rearward end 36. The seat frame structure further includes front 38 and back 40 members which are secured to the upper sliding track 33 between the forward 34 and rearward 36 ends.

Figure 5:
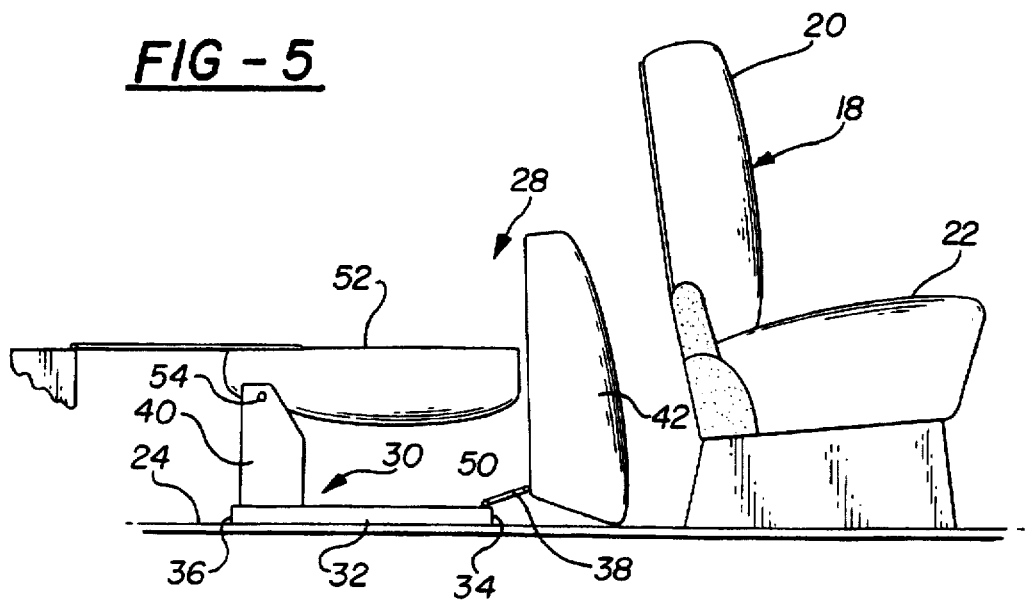
FIG. 5 is a side view of two vehicular seats with the second seat shown in the load floor position.
Figure 6:
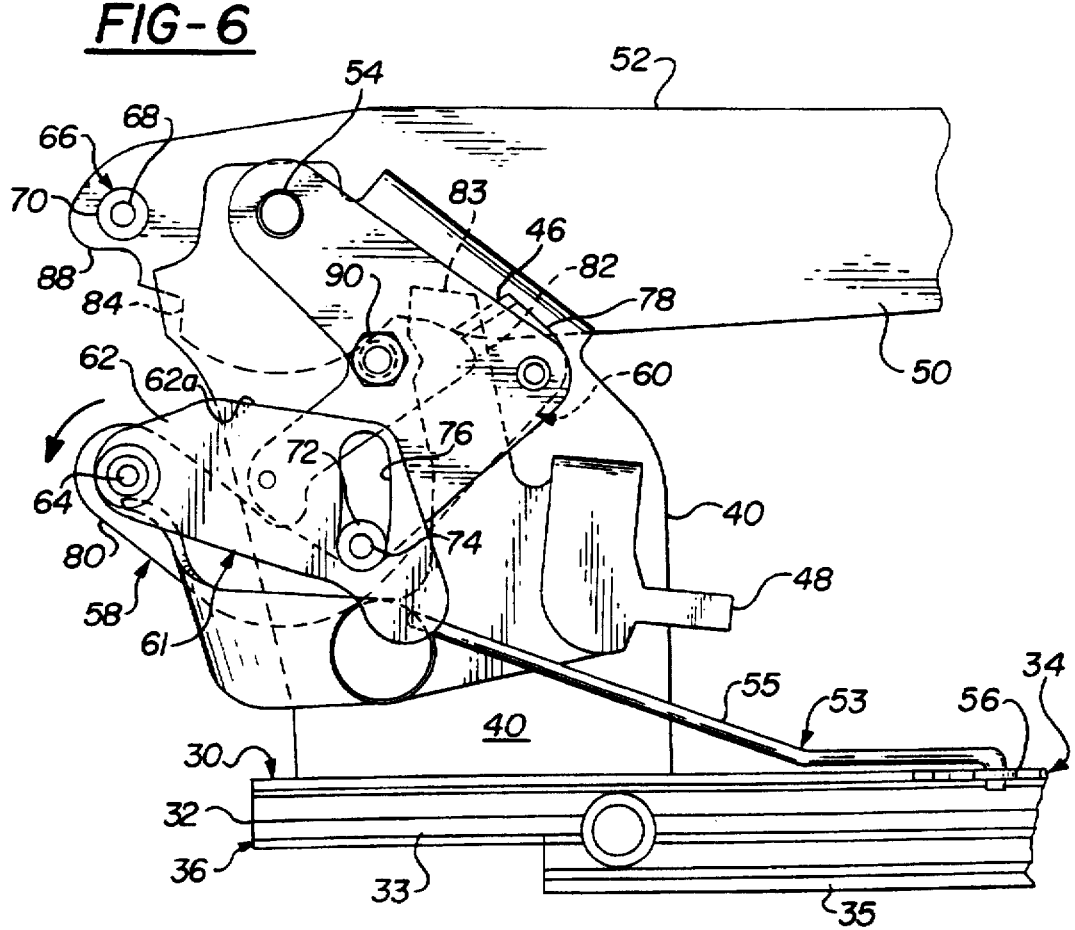
FIG. 6 is a side view of the preferred embodiment of the subject invention in the load floor position.

A seat cushion 42 is pivotally secured by the front member 38 of the seat frame structure 30 to the upper sliding track 33. The seat cushion 42 is further removably secured to the back member 40. The seat cushion 42 is movable between a seat forming position (FIG. 1), a storage access position (FIG. 3) and a load floor position (FIG. 5). The orientation of the seat cushion 42 is identical between the seat forming position and the storage access position, the only difference being the location of the seat cushion 42 with respect to the track 32. In the seat forming position, the seat cushion 42 is in its rearward most position along the track 32 and, in the storage access position, the seat cushion 42 is in the forward most position with respect to the track 32. The back portion 44 of the seat cushion 42 may be locked in place by a latch (not shown), typically known in the art. Once the latch is released via moving a lever or activating a push-pull cable assembly, the seat cushion 42 may be moved to the load floor position as shown in FIG. 6.

The vehicular seat assembly 28 further includes a seat back 50 which is pivotally secured to the back member 40 of the seat frame structure 30 and movable between the seat forming position (FIG. 1), the storage access position (FIG.

3) and the load floor position (FIG. 5). The seat back 50 includes a hard back surface 52 which, in the load floor position, becomes an extension of the load floor 26 increasing the space with which to store and transport a load. The seat back 50 pivots about a pin 54 which is fixed in place by the back member 40.

The seat track means 32 includes seat adjustment means, generally shown at 53, selectively operable between a locked position and a release position. When the seat adjustment means 53 is in the locked position, the seat back 50 and cushion 42 are prevented from moving fore and aft, i.e., toward and away from the front end 14 of the vehicle 10, respectively. Similarly, if the seat adjustment means 53 is in the release position, the seat back 50 and cushion 42 can move fore and aft.

The seat adjustment means 53 includes a pawl 56 pivotally connected to the upper sliding track 33 and having an outwardly extending leg (not shown) which extends into one of a plurality of holes passing through the lower fixed track 35 to lock the seat track means 32 and prevent fore and aft movement of the seat assembly 28. In the preferred embodiment, the vehicular assembly can be locked in two positions; the seat forming position and the forward most position along the track 32 which maximizes the access to the storage area behind the vehicular seat assembly 28 when the assembly 28 is in the storage access position. The seat adjustment means 53 further includes a connecting rod 55 having a first end connected to the pawl 56 and a second end connected to a safety lock means 58, described in further detail hereinbelow.

The subject invention 28 is characterized by safety lock means 58 for preventing the fore and aft adjustment of the seat back 50 and the seat cushion 42 in response to pivotal movement of the seat cushion 42 from the seat forming position to the load floor position. The safety lock means 58 prevents the vehicular seat assembly 28 from sliding via the track 32 while the seat cushion 42 is in the load floor position.

The safety lock means 58 includes camming means 61 for moving the seat adjustment means out of the locked position and into the release position. The camming means 61 is responsive to the position of the seat back 50. More specifically, the camming means 61 moves the seat adjustment means 53 out of the locked position when the seat back 50 has been unlatched and moved out of the seat forming position and toward the storage access position.

Figure 4:
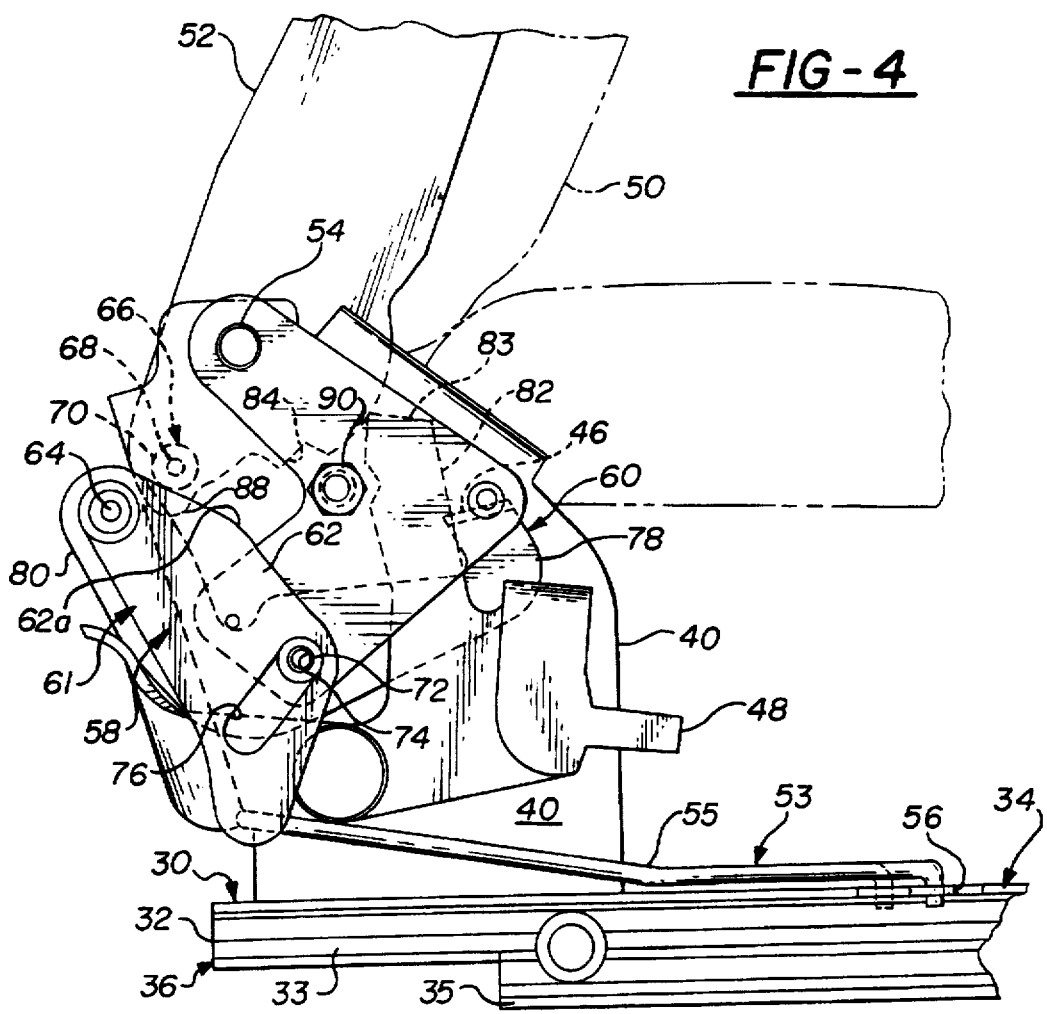
FIG. 4 is a side view of the preferred embodiment of the subject invention with the seat in the storage access position.

The camming means 61 includes a cam 62 having a cam surface 62a and a cam pivot pin 64. A follower 66 is rotatably secured to the lower end of the seat back 20. The follower 66 includes a pin 68 and a roller 70 which rolls along the cam surface 62a of the cam 62. The follower 66 forces the cam 62 to pivot about the pin 64 in a downward direction, as indicated by arrow A in FIG. 4, upon the forward pivotal movement of the seat back 20 from the upright seating position, as shown in FIG. 1 and 2, to the storage access position, as shown in FIGS. 3 and 4. The movement of the cam 62 pulls on the connecting rod 55 to release the pawl 56 from the hole in the track 32 in which it is inserted.

The back member 40 includes roller means 72 for guiding the cam 62 as it pivots about the cam pin 64. The roller means 72 includes a pin 74 about which the roller means 72 rotates. The cam 62 includes a arcuate slot 76 which receives the roller means 72 therein. When the seat back 50 is rotated down over the seat cushion 42, the follower 66 rolls along the cam surface 62a wherein the cam 62 is rotated down about the cam pin 64. The roller means 72 allows this movement to occur.

The safety lock means 58 further includes a disengaging lever 60 having two lever ends 78, 80 and a length extending therebetween. The lever 60 is pivotally attached to the back member 40 by the pin 74. The seat cushion 42 rests on a surface or platform 46 of the lever 60 and biases the lever 60 to maintain the cam 62 engaged with the follower 66 when the seat cushion 42 is in the seat forming position. The cam pin 64 pivotally interconnects the cam 62 and end 80 of the disengaging lever 60.

Connecting means 55 connects the cam 62 to the track 32 to remotely unlock the seat adjustment means 53.

Seat back releasing means 82 releases the seat back 50 from the seat forming position. The seat back releasing means 82 includes a member 83 extending upwardly from a lever 48. The member 83 extends into a notch 84 found in the seat back 50.

Stopping means 88 stops the seat back 50 from rotating from the storage access position back past the seat forming position. The stopping means 88 includes an elongated member extending down from the seat back 50 which engages a pin 90. The pin 90 is connected to the back member 40 of the seat frame structure 30.

In operation, FIGS. 1 and 2 disclose the preferred embodiment of the subject invention in the upright seat forming position. The seat cushion 42 is in a generally horizontal position resting on the platform 46 of the disengaging lever 60. The seat back 20 is in a generally vertical or upright position with the stopping means 88 abutting against the stop pin 90. The disengaging lever 60 and cam 62 are spring biased in the upward or counter-clockwise direction to urge the cam surface 62a against the follower 66 on the seat back 20. In the seat forming position the pawl 56 in engaged with the seat track means 32 to prevent the seat assembly 28 from sliding fore and aft.

Referring to FIGS. 3 and 4, the seat assembly 28 is shown in the storage access position, with the seat back 20 pivoted forwardly against the seat cushion 22. The seat cushion 22 is maintained against the disengaging lever 60. The lever 48 is depressed downwardly to release the member 83 from the notch 84 in the seat back 20. Upon the forward pivotal movement of the seat back 20, the follower 66 rotates along and presses against the cam surface 62a to force the camming means 61 downwardly and pivot about the cam pin 64. The roller means 72 slides along the slot 76 to allow the cam 62 to pivot about the cam pin 64. The roller 64 abuts against the end of the slot 76 and the cam 62 pulls on the connecting rod 55 to release the pawl 56 from the track 32 and allow the upper sliding track 33 to move the seat assembly 28 fore and aft.

Referring to FIGS. 5 and 6, the seat assembly is shown in the load floor position. The seat cushion 22 is pivoted about the front member 38 to an upright position. The lever 48 of the seat back release means 82 is again pressed down to release the seat back 20 to be pivoted forward to a generally horizontal load carrying position. However, with the seat cushion 22 removed from the platform 46 of the disengaging lever 60, the lever 60 is spring biased to pivot about the pin 74 in the counter-clockwise direction. As the first end 78 moves upwardly, the second end 80 drops downwardly toward the vehicle floor 24. The second end 80 is connected to the camming means 61 by the cam pin 64 which therefor forces the cam 62 to rotate downwardly or counter-clockwise about the roller means 72. With the cam 62 moved down, the cam surface 62a is spaced below the roller 70 on the seat back 20, and thus the seat back 20 is free to pivot forwardly to the load carrying position. Further, the roller 70 passes clear of the cam surface 62a such that the cam 62 is prevent from pivoting in the clockwise direction so that the connecting rod 55 is maintained in a fixed position and the pawl 56 remains locked with the seat track 32 to prevent fore and aft movement of the seat assembly 28 while in the load floor position.

Finally, when the seat back 20 and seat cushion 22 are returned to the seat forming position, the seat cushion 22 engages the platform 46 and press the disengaging lever 60 downwardly or clockwise, raising the end 80 of the disengaging lever 60 and the cam 62 to re-engage the roller 70 on the seat back 20 to allow further release of the track 32 to provide fore and aft movement of the seat assembly 28.

The invention has been described in an illustrative manner, and it is to be understood the terminology used is intended to be in he nature of description rather than of limitation.

Many modifications and variations o the present invention are possible in light of the above teachings. Therefore, it is to be understood that within the scope of the amended claims, reference numerals are merely for convenience and are not to be in any way limiting, the invention may be practiced otherwise than as specifically described.

We claim:

1. A vehicular seat assembly (28) for attachment to a floor (24) of a vehicle (10), said vehicular seat assembly (28) comprising:

seat back (50) and a seat cushion (42) supported for pivotal movement into and out of a seat forming position;

seat track means (32) supporting said seat assembly (28) for rectilinear fore and aft movement, said seat track means (32) including seat adjustment means (53) selectively operable between a locked position for preventing said rectilinear fore and aft movement of said seat cushion (42) and a release position for adjusting said rectilinear fore and aft position of said seat cushion (42), safety locking means (58) for preventing said fore and aft adjustment of said seat cushion (42) in response to pivotal movement of said seat cushion (42) out of said seat forming position, said safety locking means (58) including camming means (61) for engaging said seat back (50) and moving said seat adjustment means (52) out of said lock position and into said release position in response to said seat back (50) pivoting out of said seat forming position while said seat cushion is maintained in said seat forming position and a disengaging lever (60) engageble with said seat cushion (42) for disengaging said camming means (61) from said seat back (50) in response to said seat cushion moving out of said seat forming position to maintain said seat adjustment means (52) in said locked position and prevent fore and aft movement of said seat assembly (28).

2. An assembly (28) as set forth in claim 1 further comprising said camming means (62) including a cam (62) having a cam pin (64) pivotally connecting said cam (62) to said safety locking means (58) and a follower (66) fixedly secured to said seat back (50) such that said follower (66) forces said cam (62) to pivot about said cam pin (64) when said seat back (50) is pivoted out of the seat forming position.

3. An assembly (28) as set forth in claim 2 further comprising said back member (40) including roller means (72) for guiding said cam (62) as it pivots about said cam pin (64).

4. An assembly (28) as set forth in claim 3 further comprising said safety locking means (68) including a lever (60) having two lever ends (78, 80) and a length extending therebetween, said lever (60) being pivotal about said roller means (72).

5. An assembly (28) as set forth in claim 4 further comprising one of said two lever ends (80) being pivotally secured to said cam pin (64) and the other (78) of said two lever ends having a platform (46) for responding to the pivotal position of said seat cushion (42), said lever (60) rotating said cam (62) about said roller means (72) to disengage said cam (62) from said follower (66) preventing said seat adjustment means (52) from moving out of said locked position toward said release position.

6. An assembly (28) as set forth in claim 5 further comprising connecting means (54) for connecting said cam (62) to said seat adjustment locking means (52) to remotely unlock said track locking means (52).

7. An assembly (28) as set forth in claim 6 further comprising seat back releasing means (82) for releasing said seat back (50) from the seat forming position.

8. An assembly (28) as set forth in claim 7 further comprising stopping means (88) for stopping said seat back (50) from rotating from the storage access position past the upright seating position.

* * * * *